(12) United States Patent
Ryan

(10) Patent No.: US 8,208,893 B1
(45) Date of Patent: Jun. 26, 2012

(54) PERFORMANCE METRICS PROCESSING FOR ANTICIPATING UNAVAILABILITY

(75) Inventor: Thomas A. Ryan, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 1003 days.

(21) Appl. No.: 12/165,248

(22) Filed: Jun. 30, 2008

(51) Int. Cl.
*H04B 17/00* (2006.01)
*H04M 11/00* (2006.01)
(52) U.S. Cl. ............... 455/405; 455/67.11; 455/574
(58) Field of Classification Search ............ 455/67.11, 455/127.5, 226.1, 405, 407, 408, 414.1, 557, 455/574
See application file for complete search history.

(56) References Cited

U.S. PATENT DOCUMENTS

| | | | |
|---|---|---|---|
| 7,010,329 B2* | 3/2006 | Livet et al. | 455/574 |
| 2006/0217152 A1* | 9/2006 | Fok et al. | 455/557 |

* cited by examiner

*Primary Examiner* — Blane J Jackson
(74) *Attorney, Agent, or Firm* — Knobbe Martens Olson & Bear LLP

(57) ABSTRACT

A system and method for processing performance metrics of wireless devices are described. Usage data of wireless devices is obtained and processed. Based on the processed usage data, a data model associating a set of defined wireless device user activities to wireless performance metrics is created. Data obtained from the wireless devices is compared to the data model created. Based on the comparison, the data model is then maintained or updated, and a result based on the comparison is generated and transmitted.

36 Claims, 6 Drawing Sheets

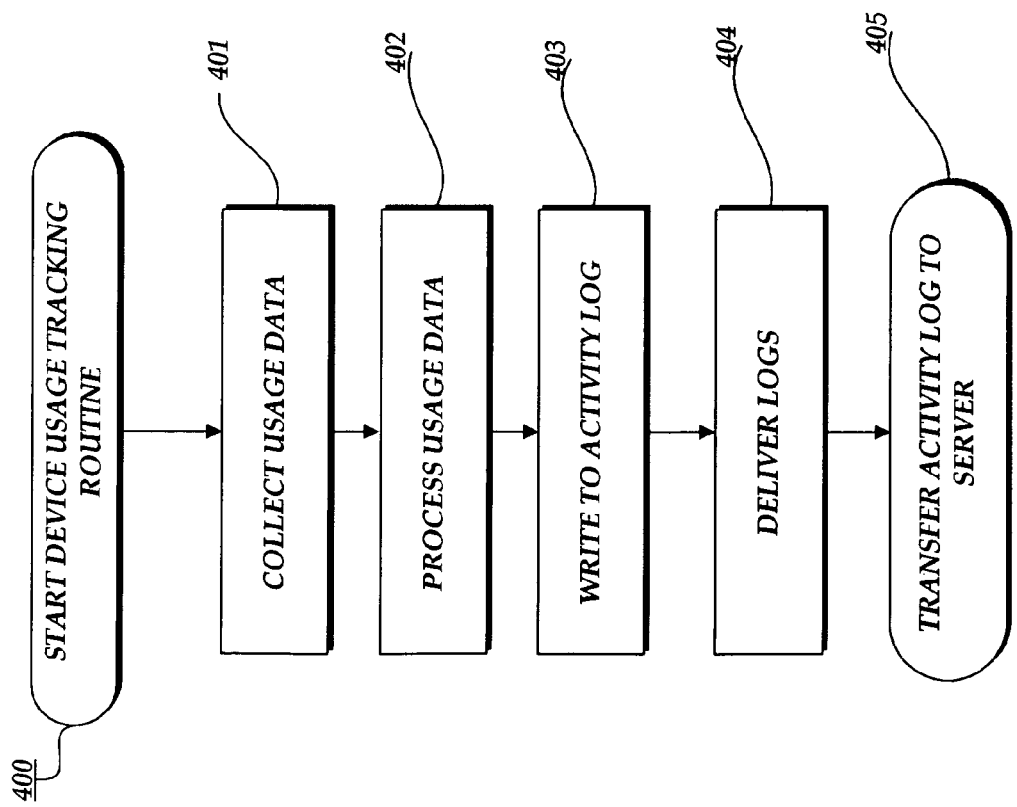

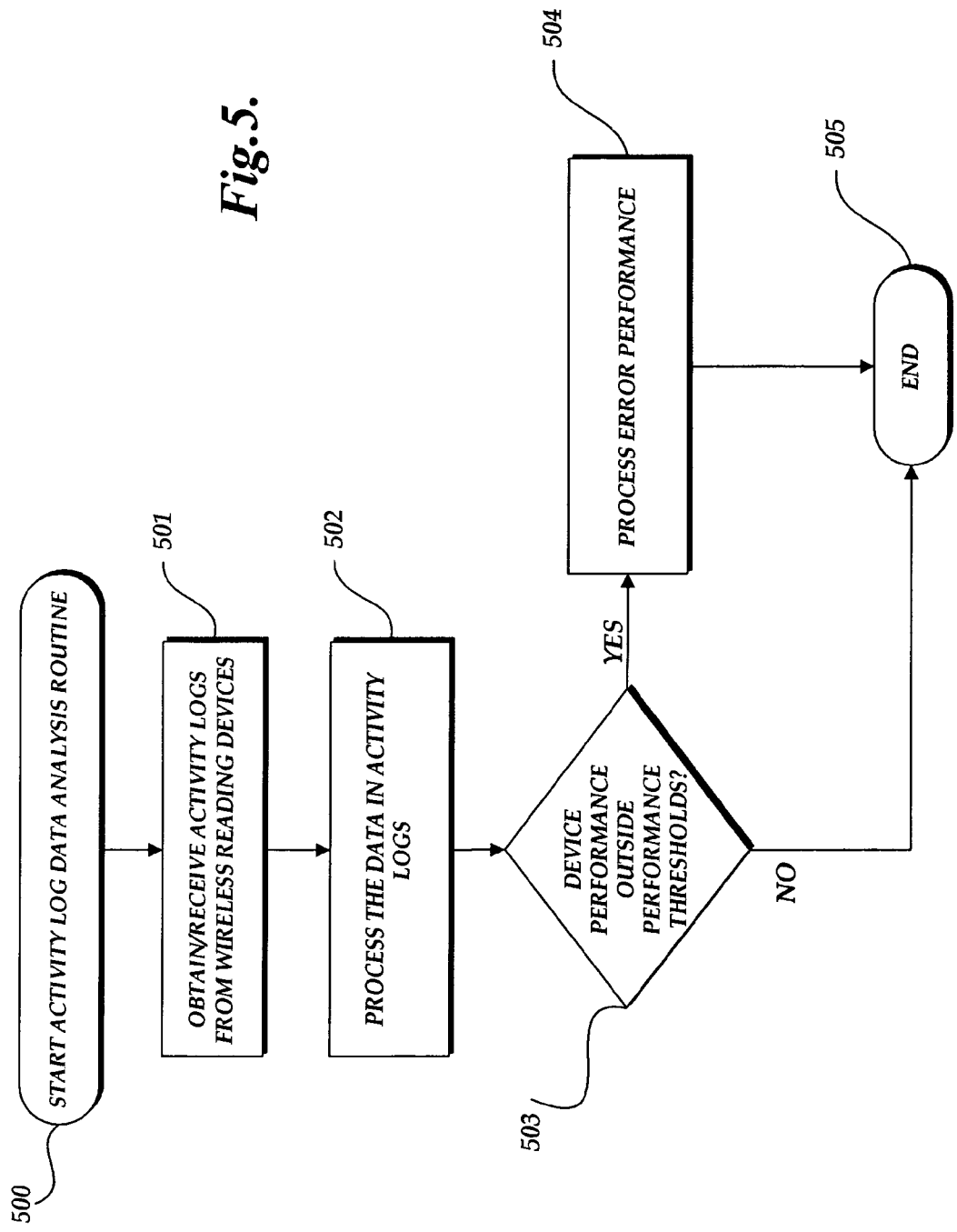

PERFORMANCE METRICS PROCESSING FOR ANTICIPATING UNAVAILABILITY

BACKGROUND

Generally described, wireless devices can be utilized to transmit and receive data and, in some cases, consume media items in electronic form. For example, a user of a wireless device may connect to a network-accessible content provider via a communication network. The user may then download data from the content provider, such as an electronic document, and view/edit the document in electronic form using the wireless device. The user may also access multi-media data, such as audio or video data, on the wireless device. In yet another example, the user may utilize a software browser application on the wireless device to request and view a Web page from a server computing device.

Providers of wireless devices are generally motivated to ensure a technically predictable and reliable performance of the devices. In general, for some devices, such as mobile phones, it may be possible to do limited testing on battery performance in a laboratory environment. For example, a mobile phone battery may be tested in a laboratory environment for duration of the battery in a "talk" mode and in a "non-talk" mode. However, other types of wireless device performance, including other aspects of mobile phone performance, may not be easily recreated or tested in a laboratory environment. For example, general laboratory testing environments are not well-suited for testing device performance given wide variations in reading habits, content, transmission and/or storage of content, etc.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 4 is a flow diagram of an illustrative device usage tracking routine implemented by a wireless reading device to collect and process usage data; and FIG. 5 is a flow diagram of an illustrative activity log data analysis routine implemented by a performance metrics processing server to process data in activity logs and to process error performance.

DETAILED DESCRIPTION

Generally described, the present disclosure is directed to monitoring and processing usage data for a set of wireless devices and creating data models of such usage. Data models based on data indicative of actual use of the device based on collected use information, which can take into account environmental factors, user usage patterns, content usage patterns, and the like. For example, data models of usage can be created to analyze specific performance metrics of a device, for example, battery usage, wireless connection/network usage, touch screen usage, LCD usage, LCD backlight usage, gyroscope/accelerometer usage (in what positions does the user hold the device), memory utilization, CPU utilization, among other metrics.

Based on the data models, individual device performance and/or batch device performance may also be assessed. Additionally, additional mitigation or remedial techniques responsive to a determination of specific performance of a device outside statistical variations from the data models may be initiated. For example, a data processing component may initiate various notifications and/or transmit software updates in response to a determination of performance outside of expected ranges.

Although various aspects of the disclosure will be described with regard to illustrative examples and embodiments, one skilled in the art will appreciate that the disclosed embodiments and examples should not be construed as limiting. In the illustrated embodiments, for example, the wireless devices being monitored are depicted as wireless reading devices such as an electronic book reader. However, those skilled in the art will appreciate that the present disclosure may apply to any type of battery-operated devices, e.g., a mobile phone, personal digital assistant, media player, laptop, etc.

Figure 1:
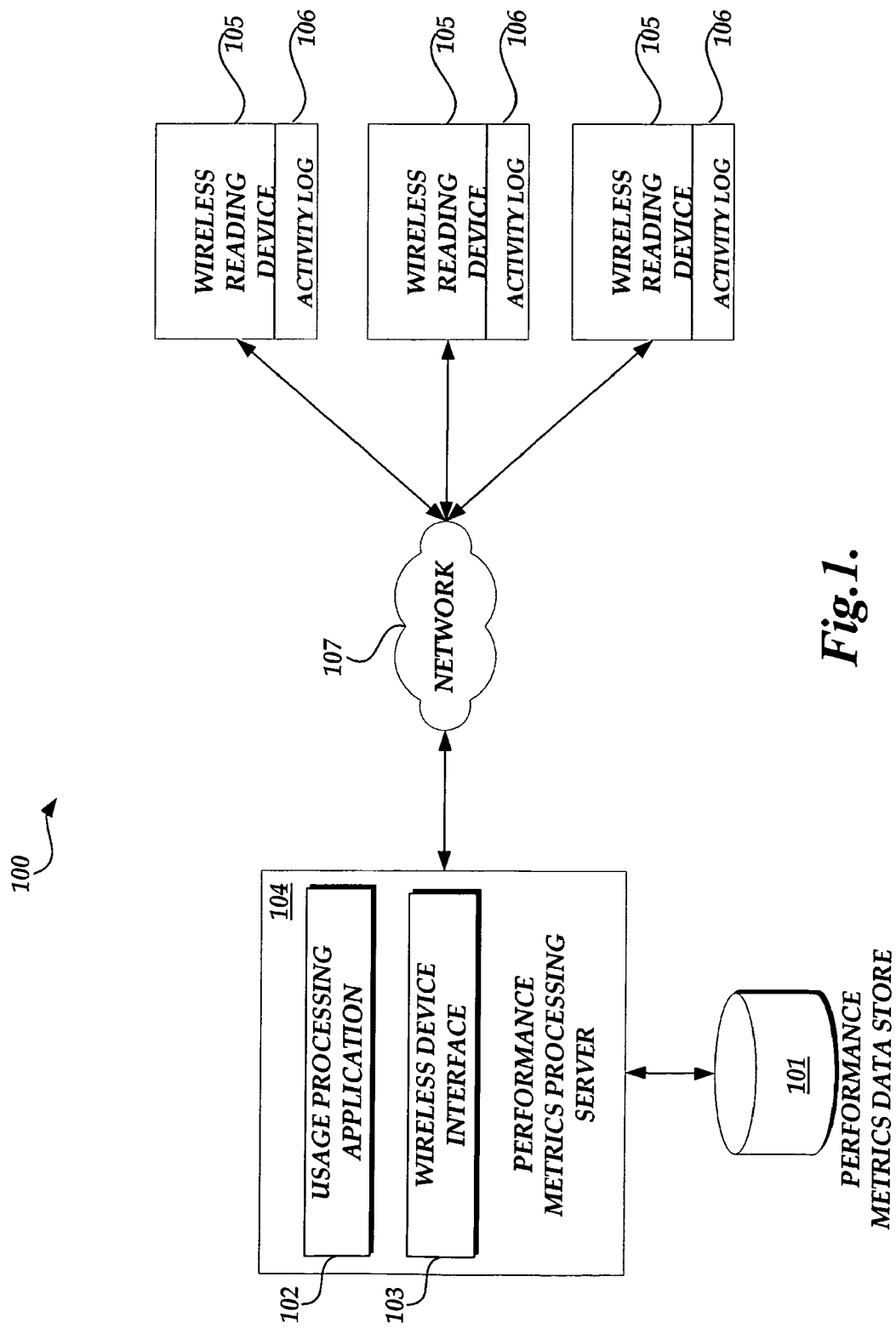
FIG. 1 is a block diagram depicting an illustrative performance metrics processing environment including a number of wireless reading devices and a performance metrics processing server.

FIG. 1 is a block diagram of an illustrative performance metrics processing environment 100 for the processing of wireless device performance. As illustrated in FIG. 1, the performance metrics processing environment 100 includes a number of wireless reading devices 105 (generally referred to as wireless devices) for collecting and transmitting activity logs to a performance metrics processing server 104. In an illustrative embodiment, the activity logs contain time statistics of usage of the wireless reading devices 105. For example, the usage of a wireless reading device 105 may consist of idle time with wireless connection turned off, idle time with wireless connection turned on, page turns during the reading of a book on the wireless device, or wide area network (WAN) activity, such as network resources browsed using the wireless device. In another embodiment, WAN activity may consist of data downloaded (e.g. size of data, type of data, etc.) via a network from a remote source. In another embodiment, the activity log can also include other information associated with a defined activity.

The wireless reading devices 105 may include necessary hardware and software components to execute, or otherwise process activity logs, as will be described in greater detail below. One skilled in the relevant art will appreciate the additional hardware/software components for processing the activity logs may be included with the execution of a multi-purpose software application, such as a browser software application. Alternatively, some or all of the additional hardware/software components may be embodied in stand alone or specialized components configured for processing the activity logs. In an illustrative embodiment, the performance metric information may be generated by hardware components (e.g., sensors) or software components on the wireless device 105. Additionally, the performance metric information may be obtained by the wireless device 105 from external resources, such as attached hardware components, remote monitoring components/services or network-based information sources.

Although not illustrated in FIG. 1, each wireless reading device 105 may utilize a processing application to process the usage data collected in activity logs 106. Usage data of the wireless reading devices 105, such as for example time statistics of user activities on the wireless reading devices 105, is collected in activity logs 106 in order for the performance metrics processing server 104 to create a data model of such usage, since this usage may not be easily simulated in a laboratory environment. Usage data of the wireless reading devices 105 may include battery usage, wireless connection/ network usage, touch screen usage, LCD usage, LCD backlight usage, gyroscope/accelerometer usage (in what positions does the user hold the device), memory utilization, CPU utilization, among other metrics. This collected usage data may be processed by the wireless reading devices 105 in order to extrapolate to data needed for such data modeling. In one embodiment, the processing application may tabulate the usage data collected and format for transmission to the performance metrics processing server 104. In another embodiment, the processing application may perform calculations on the usage data collected and format for transmission to the performance metrics processing server 104. For example, calculations may include extrapolating the usage data over a portion of the battery life of a wireless reading device 105 to the full battery life of the device. Other examples of processing the usage data may include geographical characteristics associated with the device (such as temperature, altitude), device's location in network at the time of data collection (such as proximity to network towers), device specifications (such as serial number, version number, software version number) etc.

With continued reference to FIG. 1, the performance metrics processing environment 100 can also include a performance metrics processing server 104 in communication with the one or more wireless reading devices 105 via the communication network 107. The general architecture of the performance metrics processing server 104 depicted in FIG. 1 includes an arrangement of computer hardware and software components that may be used to implement the performance metrics processing environment 100. Those skilled in the art will appreciate that the performance metrics processing server 104 may include many more (or fewer) components than those shown in FIG. 1. It is not necessary, however, that all of these generally conventional components be shown in order to provide an enabling disclosure. Additionally, although the performance metrics processing server 104 is illustrated in a client-server model, one skilled in the art will appreciate that it could be implemented in a peer-to-peer network embodiment as well.

As illustrated in FIG. 1, the performance metrics processing server 104 includes a usage processing application 102 and a wireless device interface 103, which may communicate with one another by way of a communication bus (not shown). The wireless device interface 103 enable communications with network components, such as wireless devices 105, via the network 107. The usage processing application 102 may thus receive and process activity logs 106 from wireless devices 105 via the network 107. The usage processing application 102 may also provide outputs via the wireless device interface 103. The wireless device interface 103 may also accept input from a device such as a keyboard, mouse, digital pen, etc (not shown). In addition, the performance metrics processing server may include or communicate with an auxiliary performance metrics data store 101.

Figure 2:
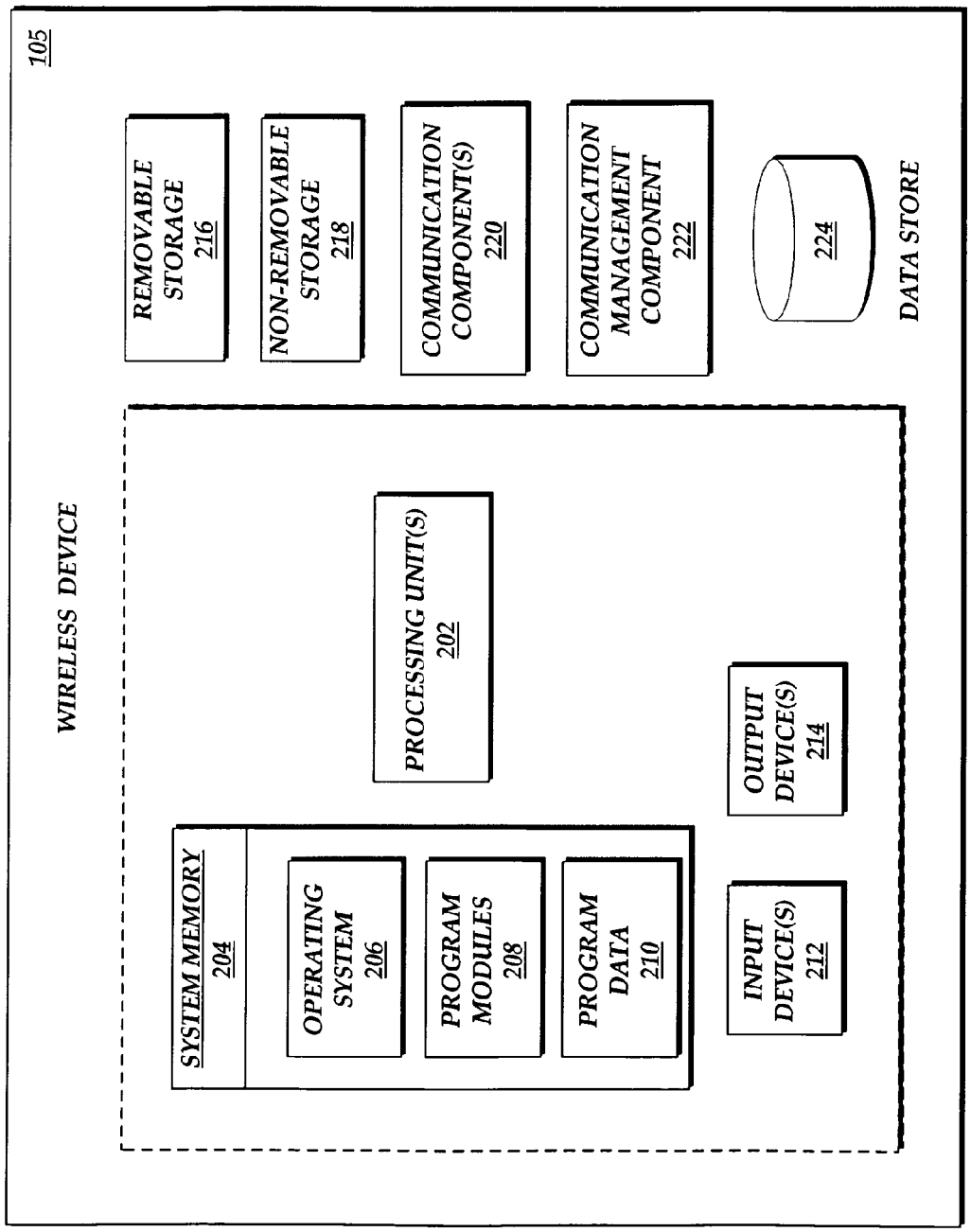
FIG. 2 is a block diagram of illustrative components of a wireless device for use in collecting activity logs for transmission to a performance metrics processing server.

With reference now to FIG. 2, illustrative components of a wireless device 105 for use in determining anticipated wireless device communication unavailability and transmitting a set of data based on anticipated wireless device communication unavailability will be described. The wireless device 105 may include one or more processing units 202, such as one or more CPUs. The wireless device 105 may also include system memory 204, which may correspond to any combination of volatile and/or non-volatile storage mechanisms. The system memory 204 may store information which provides an operating system component 206, various program modules 208, program data 210, and/or other components. The wireless device 105 performs functions by using the processing unit(s) 202 to execute instructions provided by the system memory 204. The wireless device 105 may also include one or more input devices 212 (keyboard, mouse device, specialized selection keys, etc.) and one or more output devices 214 (displays, printers, audio output mechanisms, etc.).

With continued reference to FIG. 2, the wireless device 105 may also include one or more types of removable storage 216 and one or more types of non-removable storage 218. Still further, the wireless device 105 can include communication components 220 for facilitating communication via wired and wireless communication networks, such as the wireless communication network 107 (FIG. 1). The wireless device 105 can also include a communication management component 222 and associated data store 224 for processing wireless device and user event information and determining communication events based on anticipated unavailability for the wireless device to exchange information via the wireless communication network. The above-enumerated list of modules is representative and is not exhaustive of the types of functions performed, or modules implemented, by the wireless device 105. One skilled in the relevant art will appreciate that additional or alternative components may also be included in the wireless device 105 to carry out other intended functions such as for an electronic book reader or a mobile telephone.

Figure 3A:
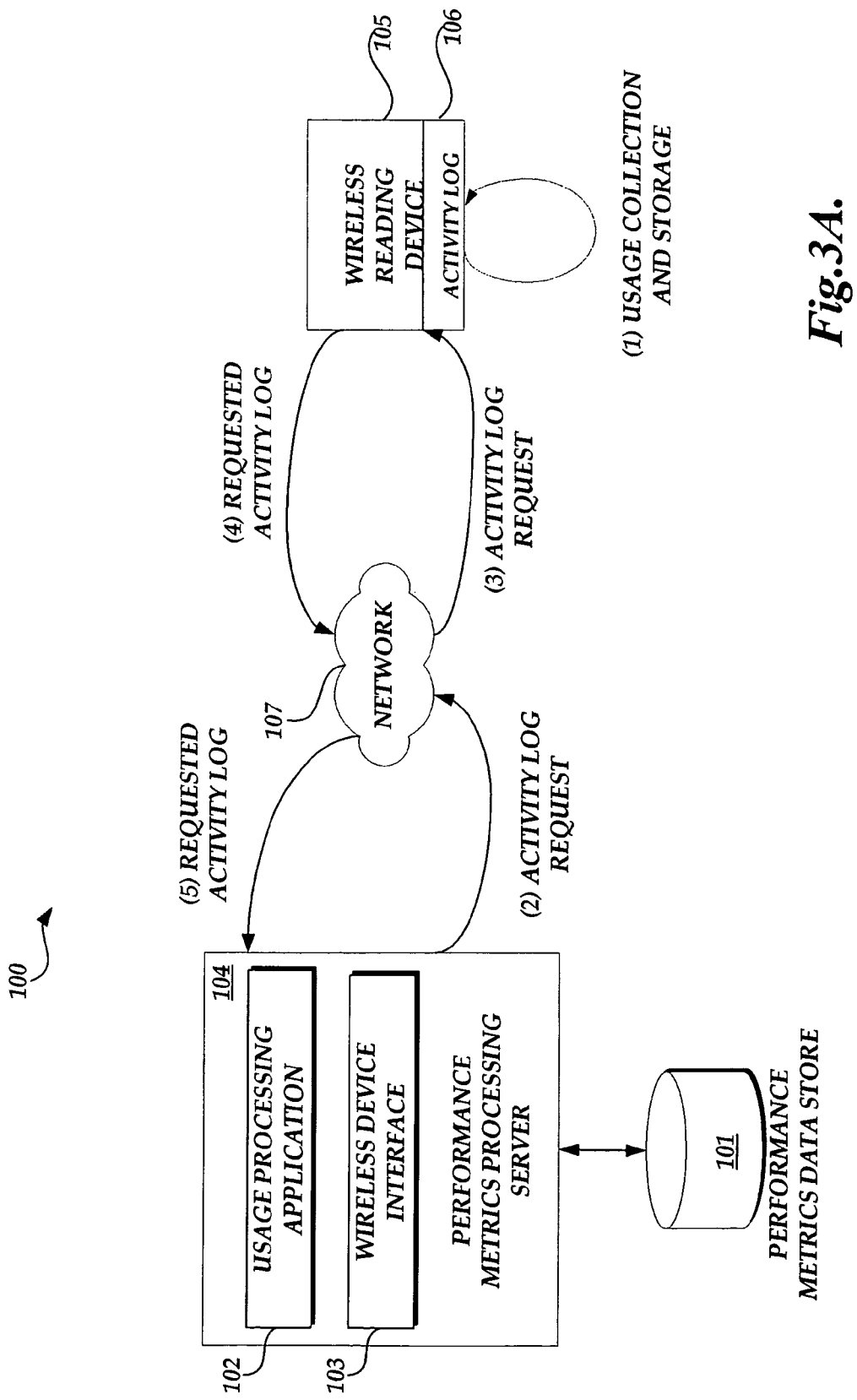
FIG. 3A is a block diagram of the performance metrics processing server shown in FIG. 1 illustrating the initiation of a transfer of an activity log from a wireless reading device.
Figure 3B:
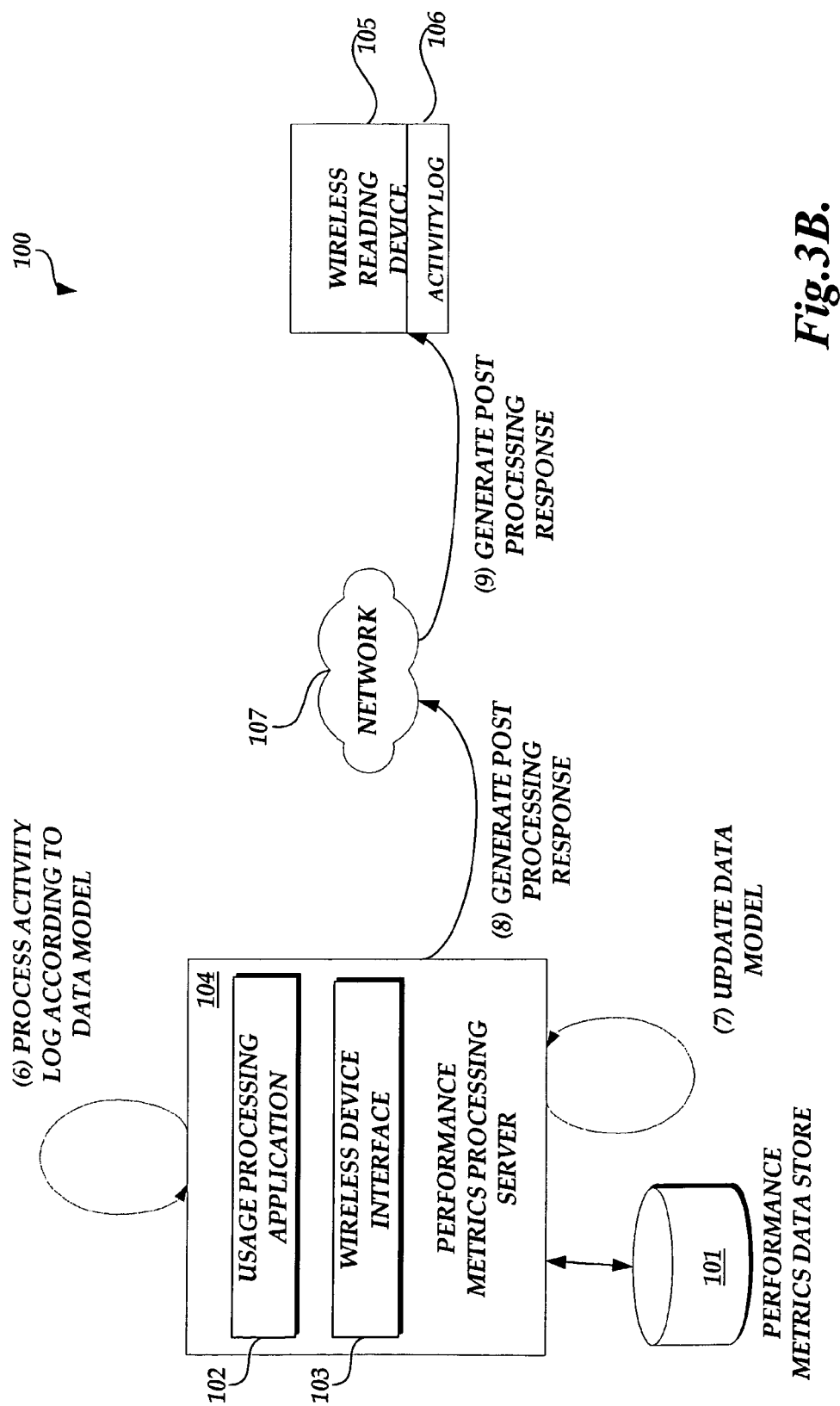
FIG. 3B is a block diagram of the performance metrics processing server shown in FIG. 1 illustrating the processing of the activity log and the generation of a post processing response.

With reference now to FIGS. 3A and 3B, the interaction between various components of the performance metrics processing environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 3A depicts an illustrative embodiment in which the performance metrics processing server 104 initiates the transfer of an activity log 106 from the wireless reading devices 105. As the wireless reading device 105 collects and stores usage data in an activity log 106, the performance metrics processing server 104 may request the activity log 106 from the wireless reading device 105 via the network 107 or the wireless reading device 105 may initiate a transfer of the activity log 106 to the performance metrics processing server 104 via the network 107. In another embodiment, the wireless reading device 105 may initiate transfer of the activity log 106 to the performance metrics processing server 104.

The transfer of the activity log 106 may be at predetermined scheduled times, and/or upon occurrence of a trigger event. For example, the transfer may be scheduled to occur at set times or time intervals. In another embodiment, a trigger event may correspond to usage of the full capacity of the battery on the wireless reading device 105. Another trigger event may be each time the wireless reading device 105 establishes a wireless connection. In such an embodiment, the activity log may be partially transmitted and/or updated at various times. Those skilled in the art will recognize that a variety of scheduled times and/or trigger events can be used to initiate transfer of the activity logs.

The activity log 106 corresponds to usage data that is processed by the wireless reading device 105, as described with reference to FIG. 1 above. The wireless reading device 105 then transmits the requested activity log 106 via the network 107 to the performance metrics processing server 104. In an illustrative embodiment, the activity log 106 is received by the wireless device interface 103 at the performance metrics processing server 104. In alternative embodiment, the wireless device 105 may transmit the data to a network based processing component or a network based storage service.

With reference now to FIG. 3B, the performance metrics processing server 104 processes the activity log 106 in order to create, maintain and/or update a data model of usage, as will be explained in greater detail below. The creation, maintenance and updating of the data model can be a dynamic process. In an illustrative embodiment, the dynamically creating, maintaining, and updating the data model includes an evolution of the data model without requiring user interaction, in an autonomous manner in response to or following changes to the activity logs 106 received from the wireless reading devices 105. In an alternative embodiment, the creation, maintenance and update process may be based on batch processing. In an illustrative embodiment, this processing is performed by the usage processing application 102.

Once the activity log is processed by the usage processing application 102, the performance metrics processing server 104 can generate a post processing response to the network 107. This post processing response may be a confirmation that the wireless reading device 105 is performing according to the data model. In another embodiment, this post processing response may be an indication that the wireless reading device 105 is not performing according to the data model. In one embodiment, the response transmitted to the network is sent to a user. The user may then have an indication of the device's performance level, and either do nothing, contact customer/technical service or perform another action to address the performance of the wireless reading device 105. In another embodiment, the response transmitted to the network 107 is sent to an administrator. The administrator may then either do nothing, contact the user for notification of the performance of the device, contact customer/technical service or perform another action to address the performance of the wireless reading device 105. In yet another embodiment, the post processing response comprises identification or initiation of remedial measures. For example, a remedial measure may be a software update that is transmitted to the wireless device. Another example of a remedial measure would be to ship a replacement wireless device to the user, by proactively initiating a return or recall process based on a determination that the device performance is outside of expected thresholds, by comparison to the data model.

With reference now to FIG. 4, a device usage tracking routine 400 implemented by a wireless reading device 105 to collect, process and store usage data will be described. At block 401, wireless reading device 105 collects usage data. As previously described, usage data of the wireless reading devices 105 may correspond to information related to a variety of hardware components or software components associated with the wireless devices such as battery usage, wireless connection/network usage, touch screen usage, LCD usage, LCD backlight usage, gyroscope/accelerometer usage (in what positions does the user hold the device), memory utilization, CPU utilization, among other metrics. In an illustrative embodiment, this usage data can be in the form of idle time with wireless connection turned off, idle time with wireless connection turned on, page turns during the reading of a book on the wireless device, wide area network (WAN) activity.

At block 402, the wireless reading device 105 processes the usage data. For example, the wireless reading devices 105 may extrapolate the data collected to data needed for data modeling by the performance metrics processing server 104. In one embodiment, the processing application may tabulate the usage data collected and format for transmission to the performance metrics processing server 104. In another embodiment, the processing application may perform calculations on the usage data collected and format for transmission to the performance metrics processing server 104. For example, calculations may include extrapolating the usage data over a portion of the battery life of a wireless reading device 105 to the full battery life of the device. Other examples of processing the usage data may include obtaining geographical information associated with the device (such as temperature, altitude), recording the device's location in network at the time of data collection (such as proximity to network towers), recording device specifications (such as serial number, version number, software version number) etc. One skilled in the relevant art will appreciate, however, that block 402 may be optional if the collected performance metrics data does not need to be processed, and/or the wireless device is not capable of, authorized to, or configured to process the collected data.

At block 403, the wireless reading device 105 stores the processed usage data into an activity log 106 or otherwise updates the activity log 106. At block 404, the wireless reading device 105 delivers these logs to the performance metrics processing server 104. In one embodiment, this delivery may be at a predefined scheduled time. In another embodiment, this delivery may be upon the occurrence of a trigger event, such as for example, the full draining down of the battery of the wireless reading device 105. At block 405, the routine 400 terminates. Additionally, the routine 400 can be implemented again to track usage of wireless reading devices 105 after the activity log 106 has been transferred to the performance metrics processing server 104. This usage tracking is used to store the usage data in a new activity log 106 in order to transfer to the performance metrics processing server 104 at the next scheduled time or upon the occurrence of a next trigger event.

With reference now to FIG. 5, an activity log data analysis routine implemented by a performance metrics processing server 104 to process data in activity logs 106 and to process error performance will be described. At block 501, performance metrics processing server 104 obtains or receives activity logs 106 from wireless reading devices 105. At block 502, the performance metrics processing server 104 processes the data in activity logs 106. Generally, the processing performed by the usage processing application 102 implemented by the performance metrics processing server 104 will be in the form of creation, maintenance and/or updating of a data model. Additionally, the performance metrics processing server 104 can generate a post processing response. In an illustrative embodiment, the creation of a data model may be the association of a set of defined wireless device user activities to wireless device performance metrics. For example, the usage processing application 102 of the performance metrics processing server 104 may create a data model for battery usage by associating an aspect of battery consumption (time, percentage or other form of measurement) against the different user activities or types of activities on a wireless reading device 105. For example, having the wireless reading device idle with wireless connection turned off, having the device idle with wireless connection turned on, turning pages during the reading of a book on the wireless device, or wide area network (WAN) activity with the device. Other wireless device performance metrics may be the wireless connection/network usage, touchscreen usage, LCD usage, LCD backlight usage, gyroscope/accelerometer usage (in what positions does the user hold the device), memory utilization, CPU utilization, among others.

In an illustrative embodiment, the maintenance and updating of the data model may be the inclusion or exclusion of new activity logs 106 received from wireless reading devices 105, depending on whether these activity logs are within performance thresholds, as will be explained in more detail below. The generation of a post processing response was explained in detail above.

As way of example, the creation of a data model for battery usage on wireless reading devices 105 associated with reading pages of a book, and remaining idle will be explained in detail here. Such a data model can be created with the utilization of a set of one or more data processing equations. For example, assume a first wireless reading device 105, device A, transmits an activity log 106 upon the occurrence of a trigger event, the usage of the full capacity of the battery on that device. Assume further that the activity log 106 indicates that there are w pages read and x hours of idle time with the wireless connection turned off over a battery drain down period, with no charging in between. Similarly, a second wireless reading device 105, device B, transmits an activity log 106 upon the occurrence of the same trigger event on that device, and reports that there are y pages read and z hours of idle time over a battery drain down period, with no charging in between.

The following equations may then be established by the usage processing application 102 on the performance metrics processing server 104:

$$(w*P)+(x*H)=K \quad\quad\quad A:$$

$$(y*P)+(z*H)=K \quad\quad\quad B:$$

where P represents the amount of power consumed on the battery for each page turn, H represents the amount of power consumed on the battery for each hour of idle time with the wireless connection turned off, and K represents the battery capacity at full charge. Then, by providing the appropriate value for K corresponding to the battery size used on the wireless reading devices, the two equations may be statistically processed to determine the common values for P and H. Once the values for P and H are determined, then a data model is created. In other words, the performance metrics processing server 104 has now created a data model representing the relationship between 1) a combination of number of pages turned while reading a book and a number of hours that the device may remain idle while the wireless connection is turned off and 2) a full battery drain down period. This data model is useful since the behavior of users of wireless user devices may not be easily simulated in a laboratory given wide variations in reading habits, content, transmission and/or storage of content, etc. and therefore, the expected relationship between wireless reading device use and full battery usage cannot be predicted without such a model. As will be explained in greater detail below, multiple data models may be created according to cluster criteria. Accordingly, incoming wireless device usage data may be used to update various applicable data models and/or wireless device performance may be evaluated against one or more data models.

Once the model is created, when the performance metrics processing server 104 receives an activity log from the next wireless reading device, indicating m pages read and n hours of idle time, then the usage processing application 102 recalculates m*P+n*H with the previously determined P and H values, and determines whether K is within an acceptable range. That is, if the calculated K for this wireless reading device is lower than the appropriate K corresponding to the battery size, then the wireless reading device's battery has drained too quickly. Similarly, if the calculated K is higher than the appropriate K corresponding to the battery size, then the wireless reading device's battery has performed especially well. Depending on the result of this comparison, the performance metrics processing server 104 then transmits a post processing response to indicate the result of this comparison and initiate any necessary action, if any. In an example embodiment, this post processing response may be to transmit an assessment of the device performance to either the user or an administrator.

As will be apparent to one skilled in the art, if there are more user activities for which to determine a relationship to battery usage, then data from more wireless reading devices may need to be collected to solve the corresponding equations. In other words, data can be collected from at least as many devices as there are variables in the equations to solve. For example, if user activity additionally consists of idle time with the wireless connection turned on, and data downloaded from a network resource, then the activity logs 106 from at least an additional two wireless reading devices 105 will need to be received by the performance metrics processing server in order to have at least four equations to solve for the four variables associated with the four types of user activities.

As will be explained in greater detail below, the performance metrics processing server 104 can create and/or maintain a number of data models corresponding to different clustering of wireless device 105 data. In one example, the performance metrics processing server 104 may generate a data model corresponding to wireless device 105 data organized according to geographic criteria. In such an embodiment, data associated with users in one geographic location (such as Southern California, for example) would be clustered to create one data model. In another example, the performance metrics processing server may generate another data model corresponding to wireless device data organized according to user activity. In such an embodiment, data associated with users performing a specific type of activity (such as book reading, for example) would be clustered to create a different data model than the data model created based on data organized according to geographic criteria.

In a different embodiment, a different data model may be created by a combination of multiple performance metrics associated with a wireless device (such as battery usage as a function of temperature, altitude, gyroscope usage, etc.). In such an embodiment, the values of temperature, altitude, gyroscope usage, for example, could be used as coefficients for the calculated K of the data model. For example, the data model associated with a cluster of devices at a given temperature, temp1, could be represented by the following set of equations $$(w*P)+(x*H)=f(\text{temp1})*K \quad\quad\quad A:$$

$$(y*P)+(z*H)=f(\text{temp1})*K \quad\quad\quad B:$$

For a cluster of devices at another given temperature, temp2, the coefficient for the calculated K would be modified accordingly. Thereafter, the performance of a device in a given cluster would be compared to the data model associated with that cluster. In this way, the expected value of a performance metric may be adjusted depending on the additional information associated with a device in a given cluster. For example, the expected value of K could be set to the K associated with a nominal temperature. Then, if temp1 is lower than the nominal temperature, the K1 at temp1 could be adjusted to a lower value (since typically batteries drain down faster at lower temperatures). Likewise, the value of K2, associated with a higher temperature, temp 2, could be adjusted to a higher value (since typically batteries last longer at higher temperatures).

One skilled in the relevant art will appreciate that activity logs 106 from a particular wireless device 105 may be applied to any number of data models. For example, the activity log 106 received from a wireless device 105 for a user in Southern California who is a book reader, may be applied to a data model created for the Southern California cluster of users, as well as a data model associated with the book reader cluster of users. Additionally, as will also be explained in greater detail below, incoming activity log 106 data from a wireless device 105 may be compared to multiple data models for assessing wireless device 105 performance.

At block 503, the performance metrics processing server 104 determines whether the device performance is within or outside performance thresholds. In an illustrative embodiment, performance thresholds may be a range of values, represented in percentages, within which the value for calculated K will be acceptable. In another embodiment, a performance threshold may be an acceptable value for the sum of the variations, represented in standard deviations, of multiple performance metrics from their expected values. For example, once a data model has been created at block 502, the performance metrics processing server 104 may then compare the activity log 106 received from the next wireless reading device 105 to the data model created, and, if the K of the latest wireless reading device is within, say, 90%, of the expected value for K, then the newly calculated K may be used to update the data model. However, if the calculated K is outside the acceptable range of values for K, then the data model is not updated with this value, and the performance metrics monitoring server must then process this error performance, at block 504. In another embodiment, once data models have been created at block 502 for different clusters of users, as explained above, the performance metrics processing server 104 may then compare the activity log 106 received from the next wireless reading device 105 to all the data models associated with the user of that wireless reading device 105 (e.g. data model associated with the geographic location of the user, data model associated with the user activity, etc) and then based on the values of expected and calculated K for each data model, maintain or update the associated data model(s) and process error performance if necessary, at block 504.

In an illustrative embodiment, this error performance processing may be to generate a post processing response, as explained in reference to FIG. 2B above. In illustrative embodiments, such a response is output to a user or an administrator. The user or administrator may then perform the necessary steps to address the error performance. In another embodiment, this processing of error performance may be the identification of a remedial measure. In other words, once the performance metrics processing server 104 determines that the wireless reading device 105 is not performing within acceptable performance thresholds, then a remedial measure is initiated. In one embodiment, this remedial measure may be to identify the need and/or initiate the transfer of a software update to the wireless reading device 105. In another embodiment, the remedial measure may be to proactively initiate a return process for all wireless devices associated with the cluster in which one device is found to perform outside of expected thresholds. In such an embodiment, the wireless device may prompt a user with a notification with instructions for returning the wireless device 105 (such as identifying available service centers or drop off locations). Alternatively, a service provider may automatically initiate the delivery of a replacement wireless device 105 to an identified user. At block 505, the routine 500 terminates. Additionally, the routine 500 can be implemented again to perform activity log data analysis of newly received activity logs 106 and update the data model, once a data model has been created.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for processing performance metrics of a target wireless device, the system comprising:

an input interface component that obtains data associated with wireless devices, wherein the wireless devices are associated with one or more of a plurality of users and wherein the wireless devices are grouped in accordance with one or more cluster criteria;

a data processing component that:

determines statistics of battery usage on the wireless devices for one or more user groups, wherein the statistics are based on, at least in part, the data obtained from the wireless devices associated with users and wherein the user groups correspond to the one or more cluster criteria;

creates, based on the statistics associated with the one or more cluster criteria, a data model associating a set of defined wireless device user activities to battery usage for the one or more user groups;

obtains data associated with a target wireless device;

compares the data obtained from the target wireless device to said created data model for the one or more cluster criteria; and generates a result based on the comparison of the data associated with the target wireless device to the created data model that enables recognition of unexpected battery usage performance on said target wireless device; and an output interface component that transmits the result.

2. The system of claim 1, wherein the data associated with wireless devices comprises time statistics of usage of the wireless devices.

3. The system of claim 2, wherein the usage of the wireless devices comprises at least one of idle time with wireless connection turned off, idle time with wireless connection turned on, page turns during the reading of a book on the wireless device with wireless connection turned off, page turns during the reading of a book on the wireless device with wireless connection turned on, and wide area network (WAN) activity.

4. The system of claim 3, wherein the usage of the wireless devices comprises a combination of two or more of idle time with wireless connection turned off, idle time with wireless connection turned on, page turns during the reading of a book on the wireless device with wireless connection turned off, page turns during the reading of a book on the wireless device with wireless connection turned on, and wide area network (WAN) activity.

5. The system of claim 3, wherein the WAN activity comprises network resources browsed.

6. The system of claim 3, wherein the WAN activity comprises data downloaded.

7. The system of claim 1, wherein the result based on the comparison to the data model comprises a transmission of an assessment of device performance.

8. The system of claim 7, wherein the transmission of the assessment of device performance is to a user.

9. The system of claim 7, wherein the transmission of the assessment of device performance is to an administrator.

10. The system of claim 1, wherein the result based on the comparison to the data model comprises an identification of a remedial measure.

11. The system of claim 10, wherein the remedial measure comprises a software update.

12. The system of claim 10, wherein the remedial measure comprises the initiation of a return or recall process for device replacement.

13. The method of claim 1, wherein cluster criteria comprises one or more of geographic location, user activity and temperature.

14. A computer-implemented method for processing performance metrics of a wireless device of interest, the method comprising:

obtaining usage data from wireless devices, wherein the wireless devices are associated with one or more of a plurality of users and wherein the users are associated into one or more groups according to grouping criteria;

creating at least one data model for performance metrics for the one or more groups, the performance metrics, based, at least in part, on the usage data obtained from the wireless devices associated with users associated with one or more grouping criteria, wherein the at least one data model associates a set of defined wireless device user activities to wireless device performance metrics for the one or more grouping criteria;

obtaining usage data associated with a wireless device of interest;

comparing usage data obtained from the wireless device of interest to the at least one data model created for the one or more grouping criteria;

generating a result based on the comparison of usage data to the at least one data model created; and outputting the result.

15. The method of claim 14 further comprising updating the at least one data model created based on the comparison of usage data to the at least one data model.

16. The method of claim 14, wherein the at least one data model comprises a data model associated with a specific clustering of wireless devices.

17. The method of claim 16, wherein the clustering of wireless devices is based on geographic location of wireless devices.

18. The method of claim 16, wherein the clustering of wireless devices is based on at least one user associated with the wireless device.

19. The method of claim 18, wherein the clustering of wireless devices is based on activities performed by users of the wireless devices.

20. The method of claim 16, wherein the clustering of wireless devices is based on one or more performance metrics.

21. The method of claim 18, wherein one or more values associated with the at least one data model are a function of the one or more performance metrics.

22. The method of claim 21, wherein the one or more performance metrics is temperature.

23. The method of claim 14, wherein cluster criteria comprises one or more of geographic location, user activity and temperature.

24. A system for generating a data model of performance metrics of wireless devices comprising:

a data store that maintains at least one model associating user wireless device activities with wireless device performance metrics, wherein the at least one model is based on statistical association of user wireless device activity to time and wherein a model is associated with one or more cluster criteria;

an input interface component that obtains performance metric usage data associated with the wireless devices, wherein the wireless devices are associated with one or more of a plurality of users and wherein the wireless devices are grouped in accordance with the one or more cluster criteria; and a data processing component that:

determines statistics of performance metrics on the wireless devices based on, at least in part, the performance metric usage data obtained from the wireless devices, wherein the users of the wireless devices are grouped in accordance with the one or more cluster criteria;

obtains performance metric usage data from a candidate wireless device;

compares the performance metric usage data obtained from the candidate wireless device to the at least one data model associated with the one or more cluster criteria; and updates the data model based on a result of the comparison of the performance metric usage data of the candidate wireless device to the data model created.

25. The system of claim 24, wherein the performance metric usage data associated with the wireless devices comprises temperature of the wireless devices.

26. The system of claim 24, wherein the performance metric usage data associated with the wireless devices comprises software version of the wireless devices.

27. The system of claim 24, wherein the performance metric usage data associated with the wireless devices comprises serial number of the wireless devices.

28. The system of claim 24, wherein the data model of performance metrics comprises a data model based on a specific clustering of users of wireless devices.

29. The system of claim 24, wherein the statistical association of user wireless device activity to time comprises a calculation of average values for a variable and a calculation of a number of standard deviations away from the variable.

30. The method of claim 24, wherein the comparison of the performance metric usage data obtained to the data model created comprises a determination of whether the values of the performance metric usage data obtained are within a number of standard deviations away from the values of the data model.

31. The method of claim 24, wherein cluster criteria comprises one or more of geographic location, user activity and temperature.

32. A computer-readable medium having a computer-executable component, the computer-executable component comprising:

an input interface component that obtains performance metric usage data associated with the wireless devices, wherein the wireless devices are associated with one or more of a plurality of users and wherein the wireless devices are grouped in accordance with one or more cluster criteria; and a data processing component that:

obtains performance metric usage data associated with a specific wireless device;

compares the performance metric usage data obtained from the specific wireless device to a data model created for the one or more cluster criteria based on data obtained from the wireless devices associated with one or more of a plurality of users; and assesses performance of the specific wireless device based on the comparison of the performance metric usage data of the specific wireless device to the model created for the one or more cluster criteria.

33. The method of claim 32, wherein assessing performance of the wireless devices comprises:

calculating a performance metric associated with the wireless device; and determining whether the performance metric is within or not within a predetermined threshold.

34. The method of claim 33, wherein a predetermined threshold comprises a range of values, represented in percentages.

35. The method of claim 33, wherein a predetermined threshold comprises a value, represented in statistical standard deviation.

36. The method of claim 32, wherein cluster criteria comprises one or more of geographic location, user activity and temperature.

* * * * *

UNITED STATES PATENT AND TRADEMARK OFFICE
CERTIFICATE OF CORRECTION

PATENT NO.         : 8,208,893 B1
APPLICATION NO.    : 12/165248
DATED              : June 26, 2012
INVENTOR(S)        : Ryan It is certified that error appears in the above-identified patent and that said Letters Patent is hereby corrected as shown below:

In column 9 at line 7, Change "temp 2" to -- temp2 --.

In column 11, line 65, in Claim 13, change "method" to -- system --.

In column 12 at line 42, in Claim 21, change "claim 18" to -- claim 20 --.

In column 13, line 29, in Claim 30, change "method" to -- system --.

In column 13, line 35, in Claim 31, change "method" to -- system --.

In column 14, line 22, in Claim 33, change "method" to -- computer-readable medium --.

In column 14, line 28, in Claim 34, change "method" to -- computer-readable medium --.

In column 14, line 31, in Claim 35, change "method" to -- computer-readable medium --.

In column 14, line 34, in Claim 36, change "method" to -- computer-readable medium --.

Signed and Sealed this
Ninth Day of April, 2013

Teresa Stanek Rea
*Acting Director of the United States Patent and Trademark Office*